No. 700,960. Patented May 27, 1902.
T. J. LYNCH.
LOADING ATTACHMENT FOR HAND TRUCKS.
(Application filed Dec. 20, 1901.)
(No Model.)

Witnesses:
Carl H. Crawford
William H. Hall

Inventor:
Thomas J. Lynch
by Poole & Brown
his Attorneys

THE NORRIS PETERS CO., PHOTO-LITHO., WASHINGTON, D. C.

UNITED STATES PATENT OFFICE.

THOMAS J. LYNCH, OF OTTAWA, ILLINOIS.

LOADING ATTACHMENT FOR HAND-TRUCKS.

SPECIFICATION forming part of Letters Patent No. 700,960, dated May 27, 1902.

Application filed December 20, 1901. Serial No. 86,655. (No model.)

*To all whom it may concern:*

Be it known that I, THOMAS J. LYNCH, of Ottawa, in the county of Lasalle and State of Illinois, have invented certain new and useful Improvements in Loading Attachments for Hand-Trucks; and I do hereby declare that the following is a full, clear, and exact description thereof, reference being had to the accompanying drawings, and to the letters of reference marked thereon, which form a part of this specification.

This invention relates to an improved attachment for hand-trucks designed to facilitate the operation of loading boxes and the like thereon.

The invention embraces generally the application to the lower part of a hand-truck of an auxiliary foot-lever which extends rearwardly from the hand-truck in such position that the foot of the person using the truck may engage the same, said lever being adapted to engage at its forward end a part of the truck in such manner that when downward pressure is applied to the rear end of the lever, which is designed to occur when the truck is being tilted rearwardly in loading a box thereon, said auxiliary lever will exert power to assist the tilting of the truck and raising the box or case thereon.

My invention is capable of being attached to a truck already in use and may also be made a part of the truck in its original construction.

The invention consists in the matters hereinafter set forth, and more particularly pointed out in the appended claims.

Figure 1:
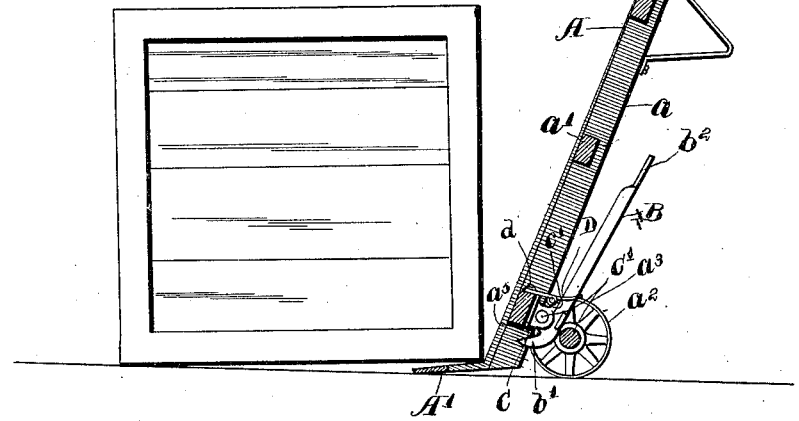
Figure 2:
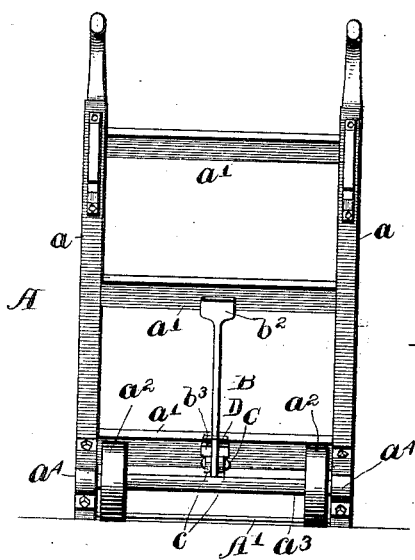
Figure 3:
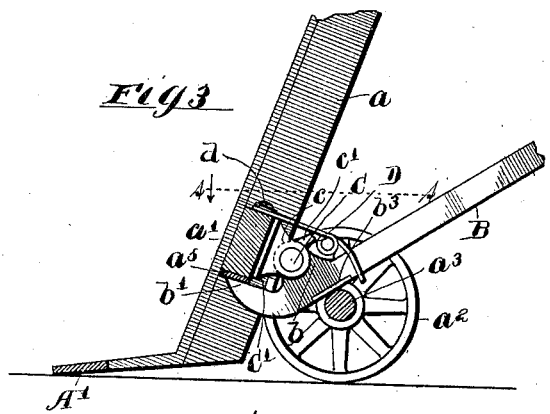
Figure 4:
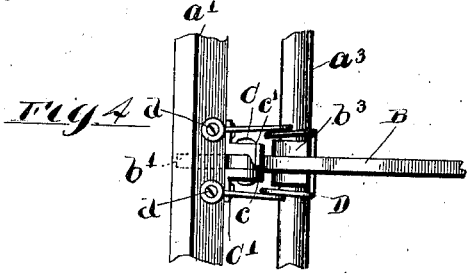

In the drawings, Figure 1 is a vertical section of a hand-truck provided with my improved attachment, showing such truck with the nose thereof under a box or case preparatory to loading said box on the truck. Fig. 2 is a rear view of a truck and the attachment. Fig. 3 is an enlarged vertical section of the lower part of the truck, showing my improved attachment in position for exerting lifting power on the lower end of the truck. Fig. 4 is a horizontal section taken on line 4 4 of Fig. 3.

As shown in said drawings, A designates as a whole a hand-truck of common form, embracing side members $a$, on the upper ends of which the handles are formed, connecting cross-bars $a'$, supporting-wheels $a^2$, rotatively mounted on an axle $a^3$, which latter is secured at its ends in suitable bearing-brackets $a^4$, attached to the side members, near the lower ends thereof. Said truck is provided with the usual nose $A'$, adapted to be inserted beneath the box or case in the manner shown in Fig. 1 preparatory to loading said box or case thereon.

Referring now to the parts constituting my improvements, B designates a lever which is located in rear of the lower part of the truck and is pivoted near its lower end upon a transverse pivot-pin C, extending through laterally-separated lugs $c$, projecting rearwardly from a bearing-bracket $C'$, attached to the rear face of the lowermost cross-bar $a'$ of the truck, said lever being provided with a lug $b$, which is located between and has overlapping engagement with the lugs $c$ of the bracket $C'$. The forward end of said lever B projects beneath the lower cross-bar of the truck-frame and is provided with a short upturned portion $b'$, adapted for engagement with the under surface of said lowermost cross-bar or preferably and as herein shown with a metal wearing-plate $a^5$, attached to the under side of said bar. The lever B is adapted to bear at its lower side against the upper side of the axle $a^3$, on which the supporting-wheels are mounted, and in order to permit accurate engagement of the lever with said cross-bar or wearing-plate the lever is adapted to fit somewhat loosely on its pivot-pin. Said lever is formed at its rear end to provide a flat footpiece $b^2$, adapted to be engaged by the foot of the person using the truck to depress said lever. Desirably the lever is provided in its part engaging the shaft $a^3$ with a wearing-plate $b^3$, set into the under surface of the lever, as shown in Fig. 3.

D designates a spring which is constructed to normally hold the lever in its uppermost position substantially parallel with the side members of the truck, as shown in Fig. 1, when the device is not in use. Said spring, as herein shown, is made of a single piece of wire bent to form a loop, which encircles said lever and the forward ends of which wire are attached by means of screws $d$ or otherwise conveniently of the lowermost cross-bar. The side members of said looped spring are coiled between their ends to give suitable resiliency to the spring. The bracket C' is provided with a stop-lug c', which is located in position to engage the lever when thrown upwardly, as shown in Figs. 1, 2, and 4, to limit the upward movement thereof and to prevent said lever from swinging so far toward the truck as to make it inconvenient for the person using the truck to apply his foot to said lever.

The operation of the device is as follows: When the device is used in connection with the common form of truck shown in the drawings, the nose of said truck is inserted between the lower corner of the box and the floor when the box is to be loaded on the truck, and in accordance with the usual method of loading the box on the truck the upper part of the box is pulled rearwardly against the truck by means of a hand-hook or the like, while at the same time the truck is tilted rearwardly about the axle $a^3$ as a fulcrum. Just before the truck is tilted rearwardly in the manner described the foot of the operator is placed upon the rear end of the lever B to depress said lever against the action of the spring D into the position shown in Fig. 3, with the forward end of the lever bearing upwardly against the frame of the truck and the intermediate part thereof bearing downwardly against the axle of the truck. The truck is now tilted rearwardly, and simultaneously therewith pressure is exerted upon the rear end of the lever, which acts conjointly with the power applied to the handles of the truck to assist in tilting the latter rearwardly to raise the box upon the truck. As the lever bears against the axle $a^3$ of the truck its fulcrum is practically coincident with the fulcrum of the truck when the latter is tilted rearwardly, so that power of said auxiliary lever is advantageously applied to assist in tilting the truck and raising the box thereon. Moreover, by reason of the fact that the fulcrum of said lever is located closely adjacent to the weight end thereof it is obvious that the application of power is enormously increased to assist in raising a box. After the box has been loaded on the truck the foot of the person using the truck is released from the lever, and the spring D acts to throw the lever upwardly into its inactive position, in which position it is entirely out of the way of the ordinary use of the truck.

By the use of the auxiliary device described a person is enabled without assistance to load upon a truck a box or case of much greater weight than would be possible without the employment of such attachment. The services of an attendant may, therefore, often be dispensed with in loading heavy boxes, which in the employment of the ordinary truck would require two persons to load.

It is obvious that my improved attachment may be readily applied to trucks already in use without marring or weakening any of the parts of the truck, and it is also obvious that the same may be employed in connection with special forms of trucks—such, for instance, as those wherein suitable clutch devices are employed to assist in loading boxes or cases thereon.

Many changes may be made in the structural details of the device herein illustrated without departing from the spirit of my invention, and I do not wish to be limited to such details except as hereinafter made the subject of specific claims.

I claim as my invention—

1. An attachment for hand-trucks comprising a lever and means for pivotally attaching said lever to the truck-frame, said lever being adapted at its forward end to bear upwardly against the truck-frame, a spring engaging said lever and adapted to throw the lever upwardly when not in use, and a stop for limiting the upward throw of the lever under the action of said spring.

2. The combination with a hand-truck, of a lever pivoted between its ends to said truck-frame and bearing downwardly on the axle of the truck, which latter constitutes the fulcrum of the lever, said lever extending forwardly under and bearing upwardly against the frame of the truck and extending rearwardly from its fulcrum in position to be engaged by the foot of the person using the truck, a spring applied to the lever for holding the same in its uppermost position and a stop for limiting the upward movement of the lever.

3. The combination with a hand-truck, of a pivoted lever adapted to bear downwardly against the axle which latter constitutes a fulcrum for the lever, said lever extending at its forward end under and bearing upward against the truck-frame, and extending at its rear end in position to be engaged by the foot of the operator, a spring applied to the lever for holding the same in its uppermost position, and a stop for limiting the upward movement of said lever with the free end thereof separated a distance from the truck-frame, to be readily engaged by the foot of the operator.

In testimony that I claim the foregoing as my invention I affix my signature, in presence of two witnesses, this 5th day of December, A. D. 1901.

THOMAS J. LYNCH.

Witnesses:
 TAYLOR E. BROWN,
 GERTRUDE BRYCE.